(No Model.) 4 Sheets—Sheet 1.
G. F. WEISS.
BAND CUTTER AND FEEDER FOR THRESHING MACHINES.
No. 578,795. Patented Mar. 16, 1897.

Witnesses,
Wm. W. Deutsch.
John W. Huse

Inventor.
GEORGE F. WEISS,
by Atty N. DuBois.

(No Model.) 4 Sheets—Sheet 2.

G. F. WEISS.
BAND CUTTER AND FEEDER FOR THRESHING MACHINES.

No. 578,795. Patented Mar. 16, 1897.

Witnesses,
Wm. W. Deutsch
John W. Hesse

Inventor,
GEORGE F. WEISS,
by Atty. N. DuBois.

(No Model.) 4 Sheets—Sheet 4.

G. F. WEISS.
BAND CUTTER AND FEEDER FOR THRESHING MACHINES.

No. 578,795. Patented Mar. 16, 1897.

Witnesses,
Wm. H. Deutsch.
John W. Huss

Inventor,
GEORGE F. WEISS,
by Atty. N. DuBois,

THE NORRIS PETERS CO., PHOTO-LITHO., WASHINGTON, D. C.

UNITED STATES PATENT OFFICE.

GEORGE F. WEISS, OF SPRINGFIELD, ILLINOIS.

BAND-CUTTER AND FEEDER FOR THRESHING-MACHINES.

SPECIFICATION forming part of Letters Patent No. 578,795, dated March 16, 1897.

Application filed August 10, 1896. Serial No. 602,267. (No model.)

*To all whom it may concern:*

Be it known that I, GEORGE F. WEISS, a citizen of the United States, residing at Springfield, in the county of Sangamon and State of Illinois, have invented a certain new and useful Band-Cutter and Feeder for Threshing-Machines, of which the following is such a full, clear, and exact description as will enable those skilled in the art to which it appertains to make and use my said invention.

My invention relates to machines of that class which are used as attachments to ordinary threshing-machines and which receive the bundles of grain as they are pitched from the stack, cut the bands, and convey the grain into the threshing-machine.

The purposes of my invention are to provide bundle-conveyers of novel and improved construction which will automatically yield to adapt themselves to bundles of different sizes, to provide band-cutting and bundle-splitting mechanism of novel and improved form adapted to cut the bands of the bundles as they pass in succession through the machine and also adapted to split the bundles longitudinally into two or more parts, to provide rakes of novel and improved construction adapted to separate the parts into which the bundles have been divided and convey said parts successively forward, and to provide means adapted to spread the grain on a conveyer which conveys it into the mouth of the threshing-machine.

With these ends in view my invention consists in certain novel features of construction and combinations of parts shown in the annexed drawings, to which reference is hereby made, and hereinafter particularly described and claimed.

Figure 1:
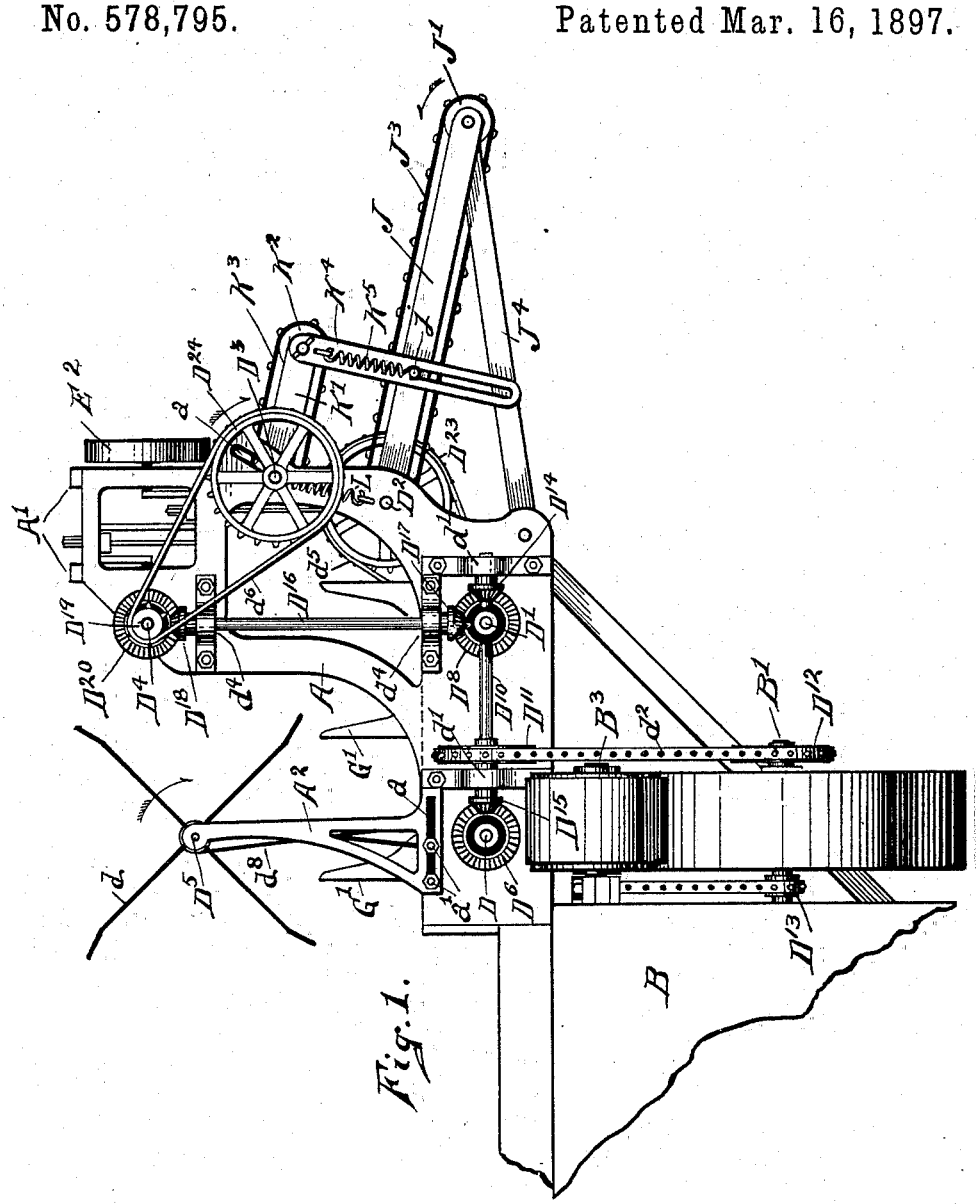
Figure 2:
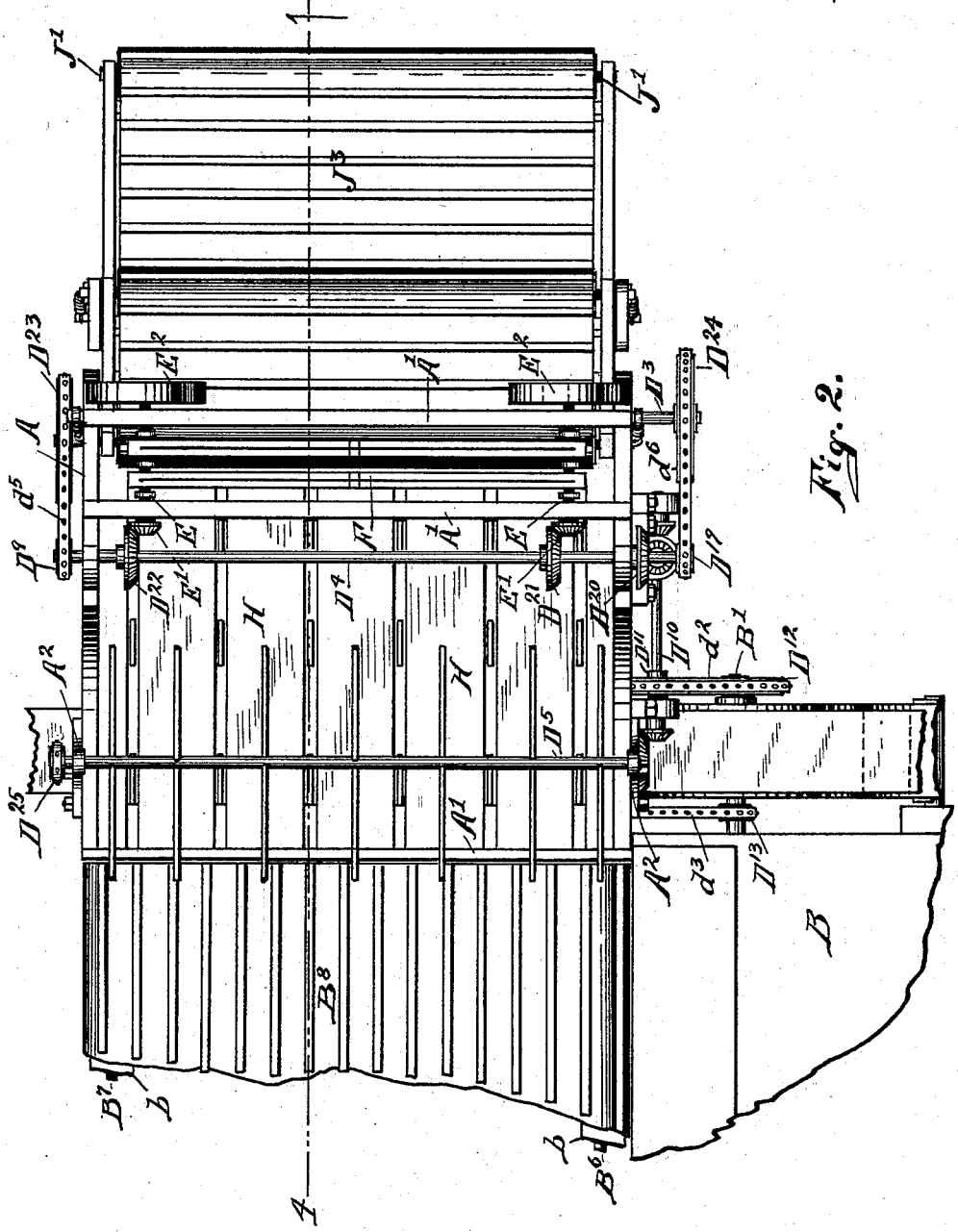
Figure 3:
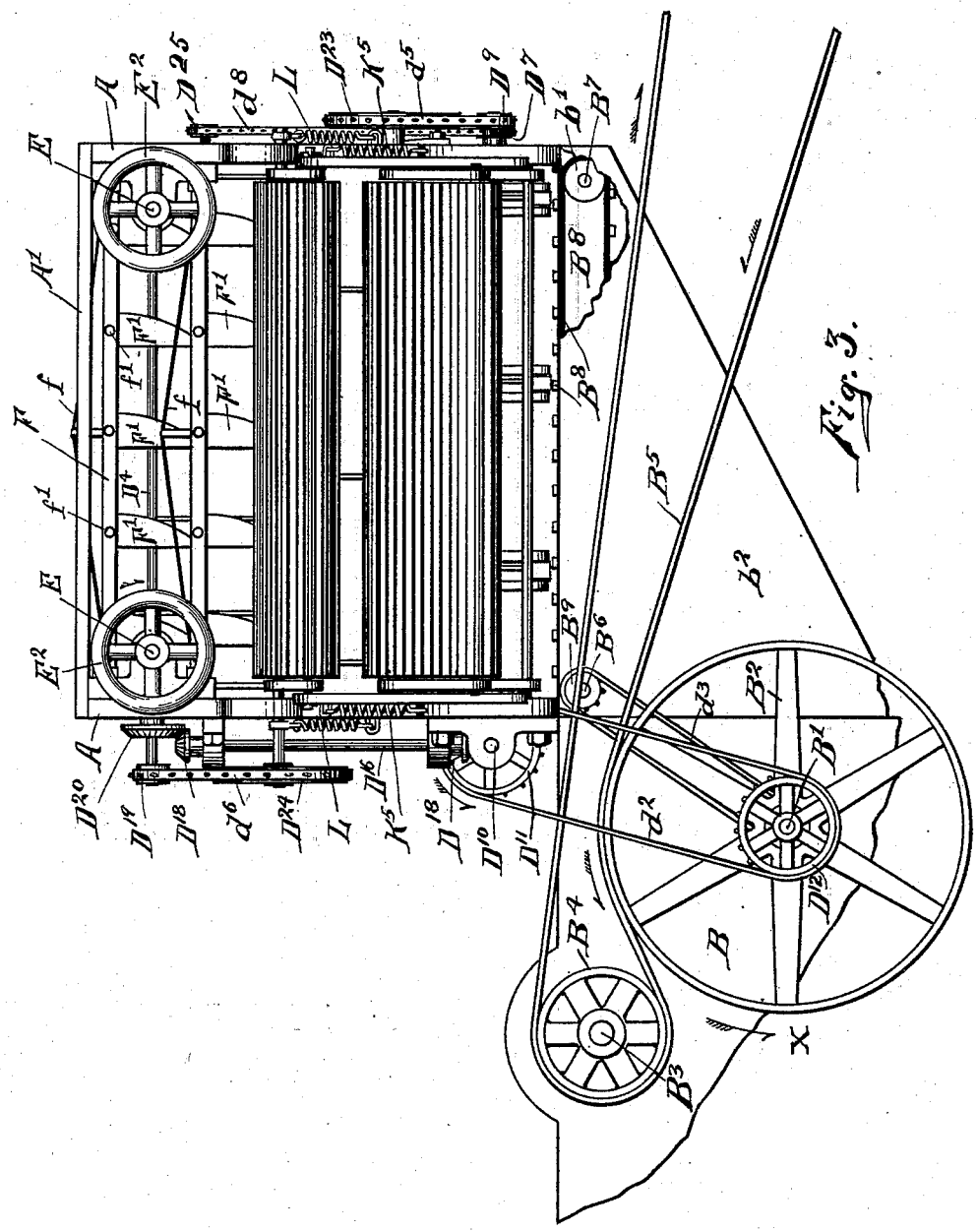
Figure 4:
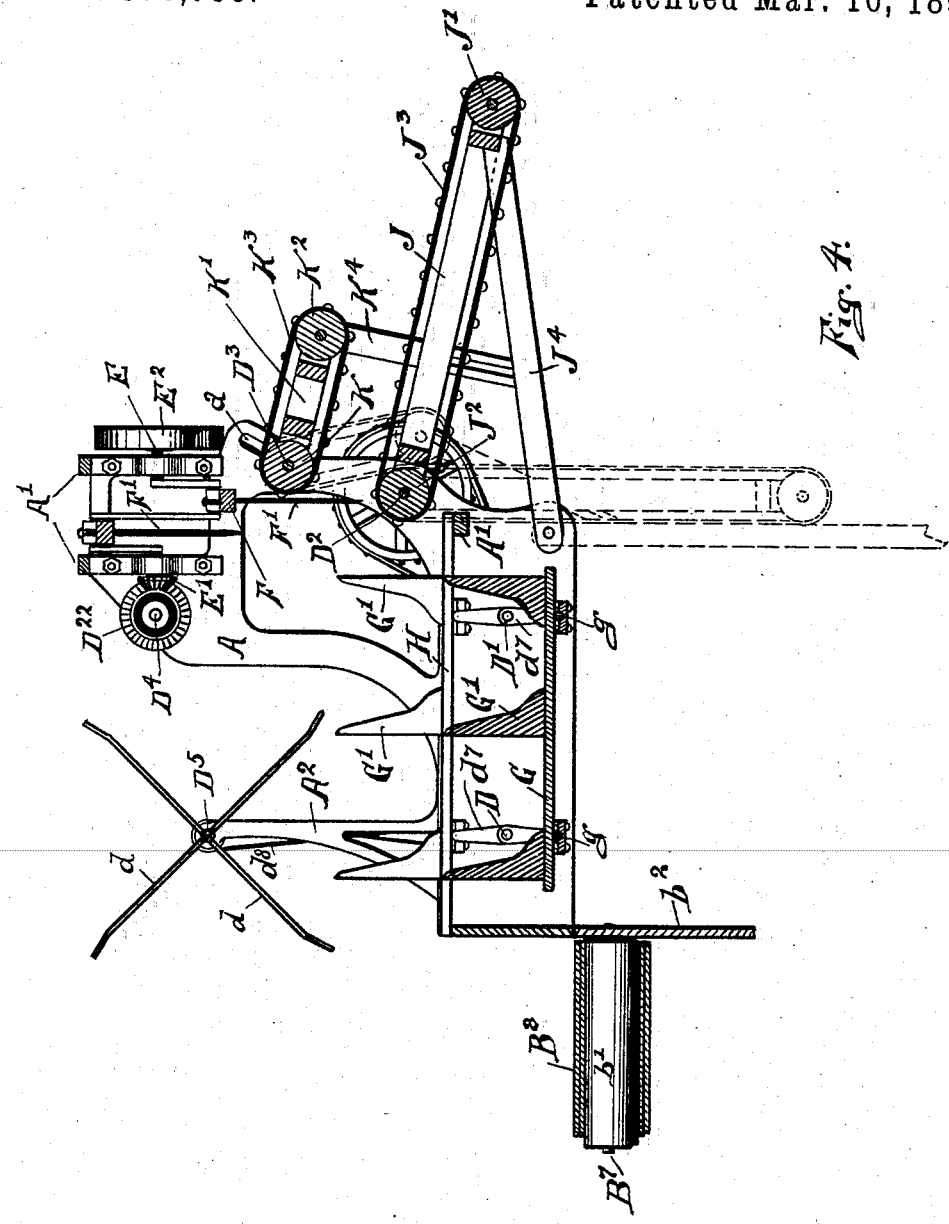

Referring to the drawings, Figure 1 is a side elevation. Fig. 2 is a top plan view. Fig. 3 is a rear elevation of the complete machine, and Fig. 4 is a vertical longitudinal section on the line 4 of Fig. 2.

Similar letters of reference designate like parts in all of the views.

In the drawings I have illustrated only so much of the threshing-machine as is necessary to show the connection of the band-cutter and feeder therewith. I have shown the band-cutter and feeder as applied to one side of the threshing-machine, but it is obvious that two band-cutters and feeders may be used on a single threshing-machine, one on each side thereof.

The main frame of the band-cutter and feeder consists of side pieces A, joined by cross-pieces A', and may be connected with and supported on the thresher B in any suitable and convenient manner. Shafts D, D', $D^2$, $D^3$, and $D^4$ extend transversely across the machine and turn in suitable bearings on the main frame. Standards $A^2$, having near their lower ends slots $a$, are connected with the main frame by bolts $a'$, passing through the sides of the main frame and through the slots in the standards, so that the standards may be adjusted longitudinally on the main frame, as hereinafter more particularly described.

A reel-shaft $D^5$ is supported and turns in bearings on the upper end of the standards $A^2$. A number of radial arms $d$ are arranged in sets on and turn with the shaft $D^5$. These arms serve to assist the rakes in removing the grain from the table of the band-cutter and feeder and depositing it on the endless-belt conveyer, which carries it into the mouth of the threshing-machine. On the shaft $D^5$ is a sprocket-wheel $D^{25}$, which is connected by a sprocket-chain $d^8$ with the wheel $D^7$ on the shaft D. (See Fig. 3.) In the drawings I have shown seven sets of four arms each on the shaft $D^5$, but a greater or less number of arms may be used without departing from my invention.

The pulley $B^2$ and the sprocket-wheels $D^{12}$ and $D^{13}$ are secured to and turn with the shaft B', which is mounted and turns in suitable bearings on the threshing-machine. The pulley $B^4$ on the cylinder-shaft $B^3$ is driven by the belt $B^5$, which is connected with the engine or other motor by which the threshing-machine is driven, and the under-run of the belt drives the pulley $B^2$ in the direction indicated by the arrow $x$ in Fig. 3. A bevel cog-wheel $D^6$ and a sprocket-wheel $D^7$ are secured on the shaft D. A bevel cog-wheel $D^8$ and a sprocket-wheel $D^9$ are secured on the shaft D'. A horizontal shaft $D^{10}$ turns in bearings $d'$ on the main frame. A sprocket-wheel $D^{11}$ and bevel cog-pinions $D^{14}$ $D^{15}$ are secured to the shaft $D^{10}$. A sprocket-chain $d^2$ connects the sprocket-wheels $D^{11}$ and $D^{12}$, and the latter drives the former. A vertical shaft $D^{16}$ turns in bearings $d^4$ on the main frame. Cog-pinions $D^{17}$ and $D^{18}$ are secured to the shaft $D^{16}$. A sprocket-wheel $D^{19}$ and bevel gear-wheels $D^{20}$, $D^{21}$, and $D^{22}$ are secured to the shaft $D^4$. A sprocket-wheel $D^{23}$ is secured to the shaft $D^2$. A sprocket-chain $d^5$ connects the sprocket-wheels $D^9$ and $D^{23}$, and the former drives the latter. A sprocket-wheel $D^{24}$ is secured to the shaft $D^3$ and a sprocket-chain $d^6$ connects the sprocket-wheels $D^{19}$ and $D^{24}$, and the former drives the latter. Double crank-shafts E turn in suitable bearings on the main frame. A bevel cog-pinion $E'$ and a fly-wheel $E^2$ are secured to each of the crank-shafts E. The cog-pinions $E'$ mesh with and are driven by the cog-wheels $D^{21}$ and $D^{22}$ on the shaft $D^4$, and as the shafts E revolve a reciprocating motion is imparted to the cutters, as hereinafter described.

The fly-wheels $E^2$ serve to keep up uniform motion of the cutters and prevent jarring and rattling during the operation of cutting the bands and splitting the bundles.

The band-cutters and bundle-splitters consist of transverse bars F, strengthened by truss-rods $f$ and provided with suitable boxes which fit on the cranks of the double crank-shafts, and blades $F'$, having curved edges, as shown, and detachably connected with said bars by means of bolts $f'$. It will be seen that by reason of providing the cutters with truss-bars, as described, great rigidity is attained without unduly increasing the weight, and by using blades of the form shown detachably connected with the bars the blades may be readily removed for the purpose of sharpening them. The cutters are run at a speed much greater than the progressive forward movement of the bundles, which come successively under and are operated upon by the cutters. Hence it will be seen that in addition to the ordinary function of cutting the bands the cutters perform the additional function of dividing the bundles longitudinally into two or more sections. This feature is of great practical advantage because there is much less danger of overfeeding and consequent clogging of the machine if the grain is fed to the cylinder uniformly in comparatively small quantities than would be the case if the undivided bundles were fed directly into the mouth of the threshing-machine.

The rakes which serve to propel forward the subdivided bundles consist of a series of bars G, provided with upwardly-projecting fingers $G'$, which may be secured to the bars in any suitable manner. On the bars G are boxes $g$, in which cranks $d^7$ on the shafts D and $D'$ fit, and as the shafts revolve reciprocating motion is imparted to the rake. The fingers $G'$ have curved edges, as shown, and are so placed on the rake-bars that the curved edges of those fingers which are nearest to the cutters slope forwardly, while the curved edges of the other fingers slope rearwardly. The purpose of this arrangement is that the first-named fingers may readily enter the longitudinal cuts made through the bundles by the cutters and may serve to separate the parts into which the bundles have been subdivided, so as to successively carry forward the several parts of the bundles as fast as they are subdivided by the band-cutters. The other fingers of the rake have vertical front edges and rearwardly-sloping rear edges, in order that during the forward stroke of the rake the fingers may most effectively act to propel the straw forward, and during the return stroke may withdraw from the straw in such manner as not to obstruct or hinder the forward movement of the grain.

The slatted table of the bundle-feeder is constructed of boards H, suitably secured to the main frame, and having spaces between them, in which the fingers of the rakes move, and the reciprocating rakes drag the grain along on the table.

The bundles are carried into the machine in position to be operated upon by the cutters by conveyers, the construction and arrangement of which I will now describe. For convenience in description I will refer to the longer of these conveyers as the "long conveyer," and the shorter of these conveyers as the "short conveyer."

The parallel side pieces J of the long conveyer are supported on the shaft $D^2$. The roller $J'$ extends transversely between and is journaled in the side pieces J. The roller $J^2$ is secured to and turns with the shaft $D^2$. An endless slatted canvas belt $J^3$ is carried on the rollers $J'$ and $J^2$. Props $J^4$, pivotally connected with the main frame, project under and support the outer end of the long conveyer in such manner that by slightly raising the outer end of the conveyer the props may be swung downward, so as to permit the conveyers to assume the positions indicated by dotted lines in Fig. 4, in order that when not in use the conveyers may be folded down out of the way, so as not to interfere with the transportation of the machine. The short conveyer consists of a roller K, secured to the shaft $D^3$, side pieces supported on said shaft, a roller extending transversely between and journaled in said side pieces, and an endless slatted belt $K^3$, carried on said rollers.

In the side pieces A are slots $a$, through which the shaft $D^3$ passes. These slots are arcs of circles having their centers in the axis of the shaft $D^4$. Springs L have their lower ends secured to the side pieces A and their upper ends connected with the shaft $D^3$. Slotted links $K^4$ are pivotally connected with the short conveyer near its outer end, and studs $j$ on the side pieces J project through the slots in the links. Springs $K^5$ have their upper ends secured to the links $K^4$ and their lower ends connected with the studs $j$. The purpose of this construction and arrangement is that the conveyers may automatically adjust themselves so as to feed bundles of different sizes. In assembling the machine the short conveyer is so placed relative to the long conveyer and the tensions of the springs L and K⁵ are such that the overrun of the belt J³ and the underrun of the belt K³ serve to convey the smaller sizes of bundles forward between the conveyers. If, then, a larger bundle is presented, the springs K⁵ and L will stretch sufficiently to raise the short conveyer, so as to permit the bundle to pass, and when it has passed will contract sufficiently to restore the top conveyer to its initial position. The springs K⁵ and L also serve to promote uniform feeding of the bundles to the cutters for the reason that the bundles are carried between the conveyers under a substantially uniform pressure, and hence the conveyer-belts act more effectively to carry them uniformly forward. When the top conveyer is raised, as described, the shaft D³ moves upwardly in the slots $a$; but inasmuch as said slots are concentric with the shaft D⁴ the raising of the shaft D³ does not in any way disturb the relations of the sprocket-wheels D¹⁹ and D²⁴ and the chain $d^6$ and does not interrupt the operation of the conveyer-belt K³.

I will now describe the mechanism for conveying the grain away from the table of the bundle-feeder and depositing it in the mouth of the threshing-machine and which for convenience in description I will hereinafter designate as the "extension-conveyer." Extensions $b^2$ are supported on and secured in any suitable manner to the end of the threshing-machine. Shafts B⁶ and B⁷ extend transversely across and turn in suitable bearings on the extensions $b^2$. Rollers $b$ and $b'$ are secured to and turn with the shafts B⁶ and B⁷, respectively, and carry a slatted endless belt B⁸, which serves to convey the grain from the bundle-feeder into the mouth of the threshing-machine. A sprocket-wheel D¹³ on the shaft B' is connected with the sprocket-wheel B⁹ on the shaft B⁶ by a sprocket-chain $d^3$, and the former drives the latter so as to operate the extension-conveyer in an obvious manner.

The operation of the mechanism is as follows: The belt B⁵ drives the pulley B², which is secured to and rotates the shaft B'. The sprocket-wheel D¹³ drives the sprocket-wheel B⁹ on the shaft B⁶ by means of the sprocket-chain $d^3$, thereby imparting motion to the extension-conveyer. The sprocket-chain $d^2$, running on the sprocket-wheels D¹¹ and D¹², imparts motion to the shaft D¹⁰, which in turn drives the shafts D and D', which operate the rakes. The shaft D¹⁶ is driven by the shaft D' and in turn drives the shaft D⁴, which in its turn drives the crank-shafts E by means of the intervening gear-wheels already described, thereby imparting reciprocating motion to the band-cutters. The shaft D⁴ also drives the shaft D³ by means of the sprocket-chain $d^6$, running on the wheels D¹⁹ and D²⁴, so as to operate the short conveyer, as already described. The shaft D' drives the shaft D² by means of the sprocket-chain $d^5$, running on the sprocket-wheels D⁹ and D²³, so as to operate the long conveyer, as already described. The reel-shaft D⁵ is driven from the shaft D by means of the sprocket-chain $d^8$.

The grain to be threshed is placed, a bundle at a time, on the long conveyer and is carried forward between the long and short conveyers under the cutters, which cut the bands and split the bundle longitudinally immediately before the delivery of the bundle to the rakes. The rakes then separate the divisional parts of the bundle and carry them along on the table until the reel-arms engage with and sweep them onto the extension-conveyer, which carries them into the mouth of the threshing-machine.

Having fully described my invention, what I claim as new, and desire to secure by Letters Patent, is—

1. In a band-cutter and feeder for threshing-machines the combination of a main frame provided with slots, rotatable shafts on said main frame, one of said shafts being movable in the slots in said main frame, side pieces J and K' supported on said shafts respectively, rollers J² and K secured to and turning with the shafts D² and D³ respectively, rollers J' and K² turning in bearings on the side pieces J and K' respectively, studs on the side pieces J, endless conveyer-belts J³ and K³ respectively, carried on the rollers J' and J² and the rollers K² and K, slotted links K⁴ sliding on the studs on the side pieces, J, springs secured to said links and connected with said studs, and springs secured to the main frame and connected with the movable shaft, as set forth.

2. In a band-cutter and feeder for threshing-machines the combination of a main frame, a table on said main frame, a long conveyer-section connected with the main frame, a short conveyer-section automatically adjustable relative to said long conveyer-section, props pivotally connected with the main frame and supporting the outer end of said long conveyer-section, reciprocating cutters adapted to cut the bands of and divide longitudinally the bundles as successively presented by said conveyer-sections, rakes adapted to separate the divisional parts of said bundles and propel them forward on said table, an extension-conveyer traveling in a direction transverse to said table and a rotatable reel adapted to sweep the grain from said table onto said extension-conveyer, as set forth.

3. In a band-cutter and feeder for threshing-machines, the combination of a main frame, crank-shafts turning in bearings on said main frame, knife-bars connected with said crank-shafts, blades connected with said knife-bars, fly-wheels secured to said crank-shafts, bundle-conveyers adapted to convey bundles into position to be split longitudinally by said blades and reciprocating rakes adapted to separate the divisional parts of said bundles and propel them forward, as set forth.

4. In a band-cutter and feeder for threshing-machines, reciprocating rakes adapted to coöperate with a bundle-splitting device and provided with upwardly-projecting fingers, each having a vertical edge and a sloping edge, said fingers being so placed that those fingers which are contiguous to the bundle-splitting device have forwardly-sloping front edges and vertical rear edges, and all the other fingers have vertical front edges and rearwardly-sloping rear edges; in combination with a slatted table through which the fingers of said rakes operate, means for conveying bundles to said table, and means for cutting the bands and splitting said bundles longitudinally immediately before their delivery to said rakes, as set forth.

In witness whereof I have hereunto subscribed my name at Springfield, Illinois, this 29th day of June, 1896.

GEORGE F. WEISS.

Witnesses:
 WM. W. DEUTSCH,
 HERBERT M. GRISWOLD.